(12) United States Patent
Poirier

(10) Patent No.: US 8,157,335 B2
(45) Date of Patent: *Apr. 17, 2012

(54) DUAL MODE UNDERCARRIAGE FOR TRACKED VEHICLE

(75) Inventor: Jean Poirier, Bonsecours (CA)

(73) Assignee: Camoplast Solideal Inc., Sherbrooke, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/966,679

(22) Filed: Dec. 13, 2010

(65) Prior Publication Data

US 2011/0079452 A1    Apr. 7, 2011

Related U.S. Application Data

(63) Continuation of application No. 11/680,909, filed on Mar. 1, 2007, now Pat. No. 7,862,131.

(51) Int. Cl.
*B60G 5/00* (2006.01)
*F16C 13/00* (2006.01)
*B62D 55/00* (2006.01)

(52) U.S. Cl. ............... 305/134; 305/138; 180/9.5

(58) Field of Classification Search ............ 305/120, 305/124, 127–132, 134, 138, 141–142; 180/9.5, 180/9.52

See application file for complete search history.

(56) References Cited

U.S. PATENT DOCUMENTS

| | | | |
|---|---|---|---|
| 2,859,068 A * | 11/1958 | Larsson | 305/134 |
| 3,826,325 A * | 7/1974 | Purcell et al. | 180/9.54 |
| 4,420,167 A | 12/1983 | Winblad | |
| 4,583,791 A | 4/1986 | Nagata et al. | |
| 4,781,257 A | 11/1988 | Gee et al. | |
| 4,819,754 A | 4/1989 | Purcell et al. | |
| 4,834,478 A | 5/1989 | Stevens et al. | |
| 4,836,318 A | 6/1989 | Tonsor et al. | |
| 4,838,373 A | 6/1989 | Price et al. | |
| 4,936,639 A * | 6/1990 | Pohjola | 305/133 |
| 5,279,378 A | 1/1994 | Grawey et al. | |
| 5,290,201 A | 3/1994 | Tesker | |
| 5,316,381 A | 5/1994 | Isaacson et al. | |
| 5,494,125 A | 2/1996 | Gustin et al. | |
| 5,505,274 A | 4/1996 | Satzler | |
| 5,615,748 A | 4/1997 | Lansberry | |
| 5,749,423 A * | 5/1998 | Burckhartzmeyer et al. | 180/9.54 |
| 5,997,109 A | 12/1999 | Kautsch | |
| 6,009,205 A * | 12/1999 | Yoshida | 382/246 |
| 6,044,921 A | 4/2000 | Lansberry | |
| 6,099,205 A | 8/2000 | Macku et al. | |
| 6,167,982 B1 | 1/2001 | Dillon | |
| 6,220,377 B1 | 4/2001 | Lansberry | |
| 6,564,889 B1 * | 5/2003 | Yamazaki et al. | 180/9.54 |

(Continued)

FOREIGN PATENT DOCUMENTS

AT    208726    4/1960

(Continued)

*Primary Examiner* — Jason Bellinger

(57) ABSTRACT

A vehicle with a frame connecting a driver wheel, an idler wheel and mid-roller wheels, an endless track belt being tensioned around the driver wheel and the idler wheel and being in contact with the mid-roller wheels on a lower run thereof, the mid-roller wheels being arranged in bogies, including a front bogie having a first pivot axis, a middle bogie and a rear bogie arranged in tandem having a second pivot axis, wherein the first pivot axis and said second pivot axis act as load transfer pivots.

44 Claims, 10 Drawing Sheets

U.S. PATENT DOCUMENTS

| | | |
|---|---|---|
| RE38,858 E | 11/2005 | Grawey et al. |
| 7,552,785 B2 * | 6/2009 | Tuhy .......................... 180/9.58 |
| 7,862,131 B2 * | 1/2011 | Poirier ........................ 305/134 |
| 2002/0003376 A1 | 1/2002 | Yoshida et al. |
| 2002/0185915 A1 | 12/2002 | Yoshida et al. |
| 2005/0029866 A1 | 2/2005 | Tamaru et al. |
| 2005/0060918 A1 | 3/2005 | Inaoka et al. |
| 2010/0071969 A1 | 3/2010 | Rainer |

FOREIGN PATENT DOCUMENTS

| | | |
|---|---|---|
| CA | 2115317 | 8/1995 |
| EP | 0408551 | 1/1991 |
| EP | 1964757 | 9/2008 |
| EP | 08290206 | 1/2009 |
| GB | 2155415 | 9/1985 |
| JP | 2007210509 | 8/2007 |
| WO | 2005021293 | 3/2005 |

* cited by examiner

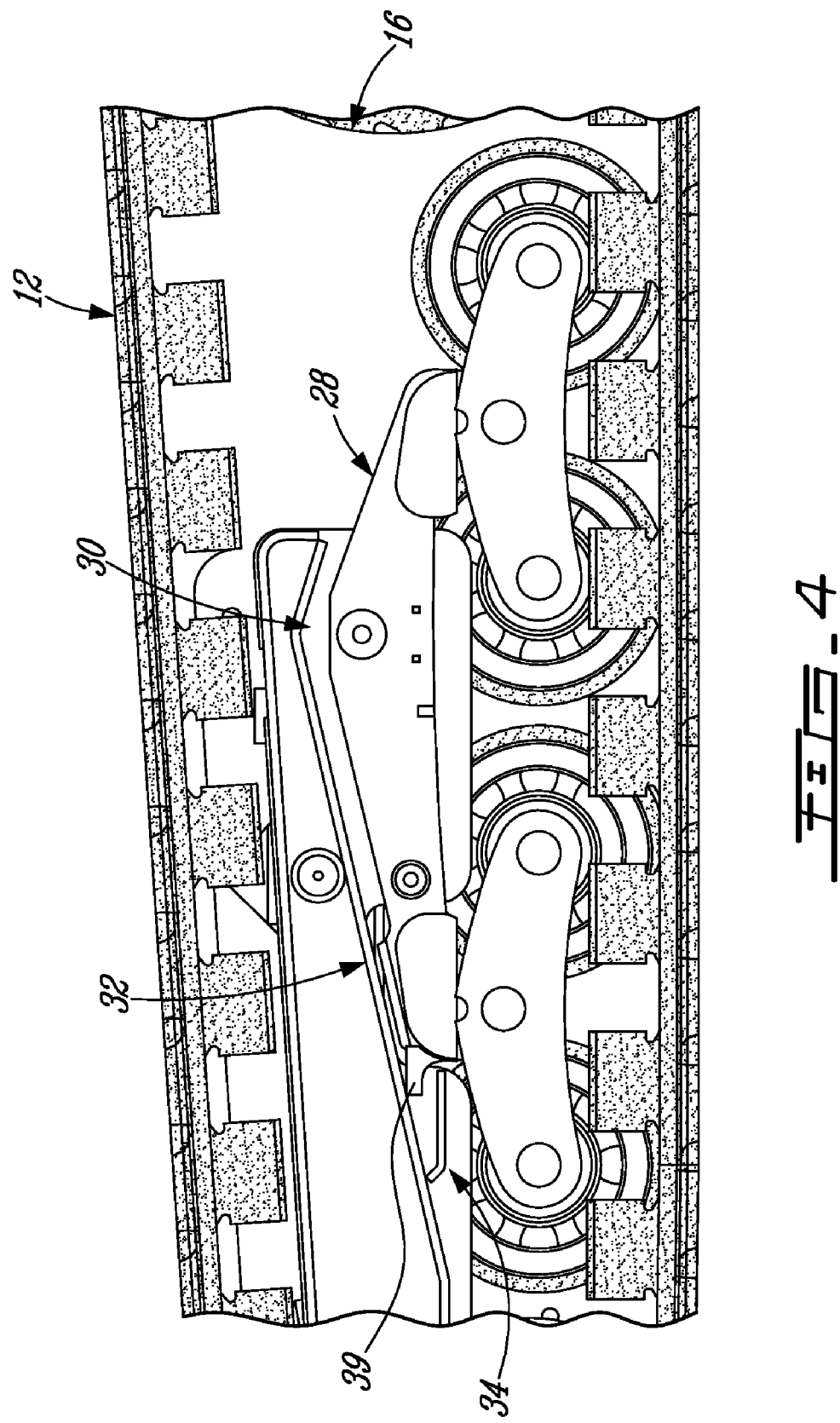

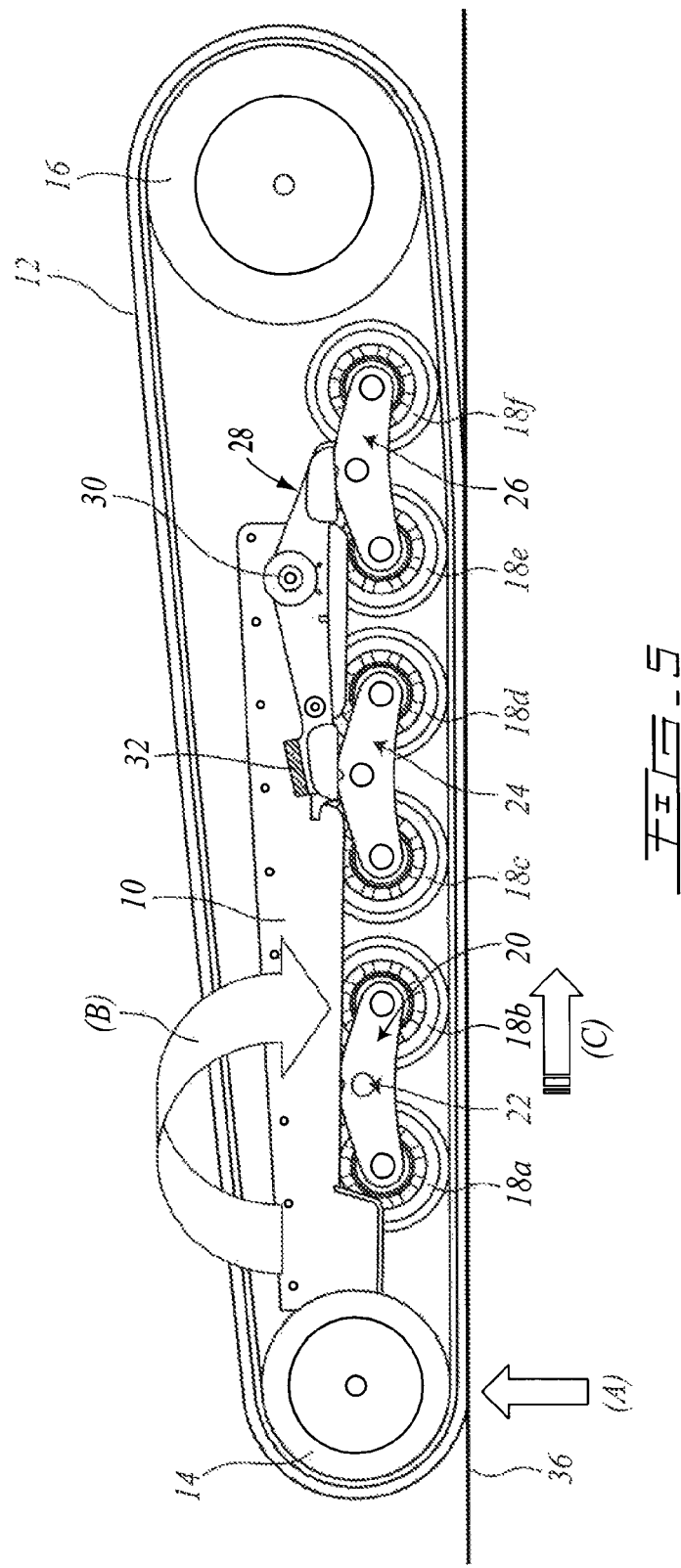

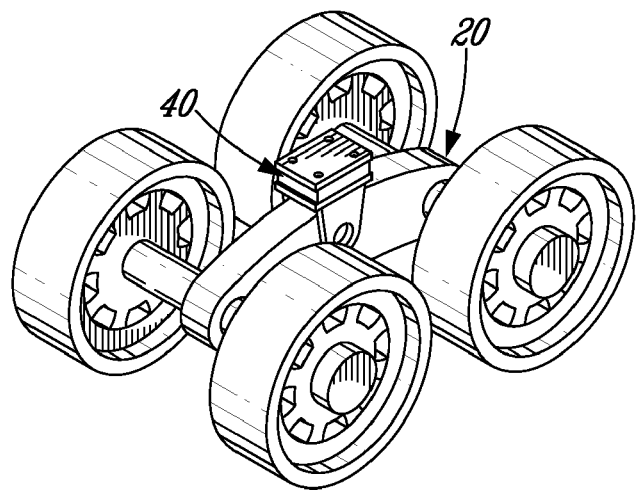
FIG_6B
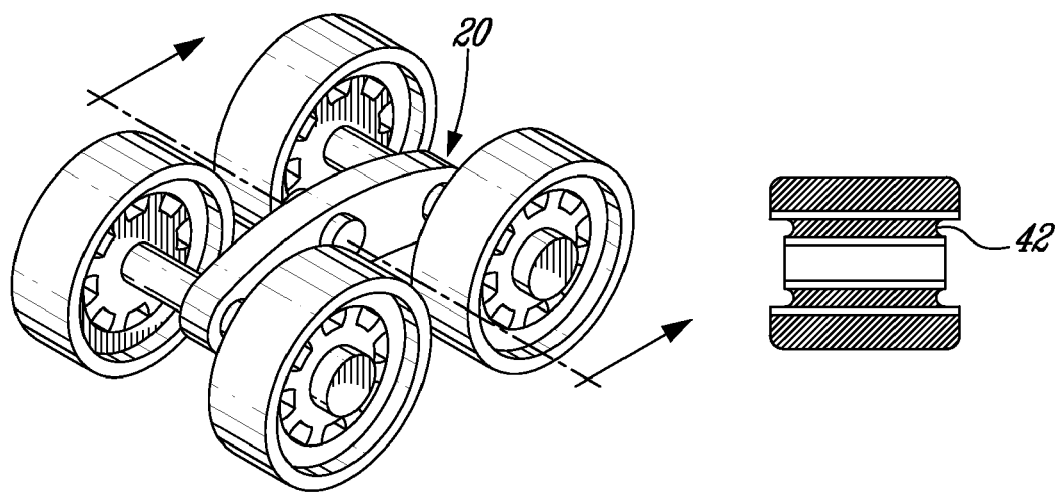
FIG_6C

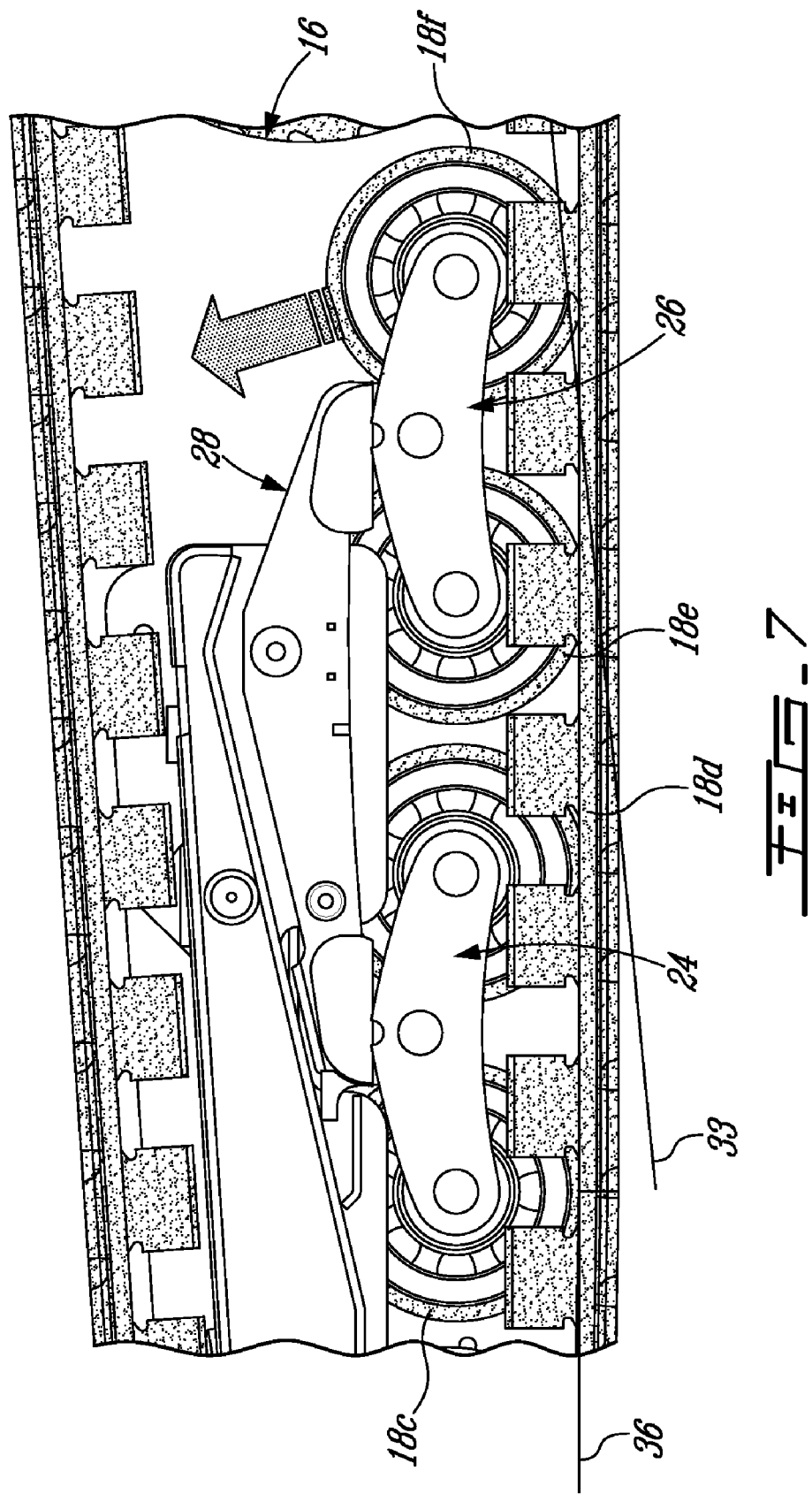

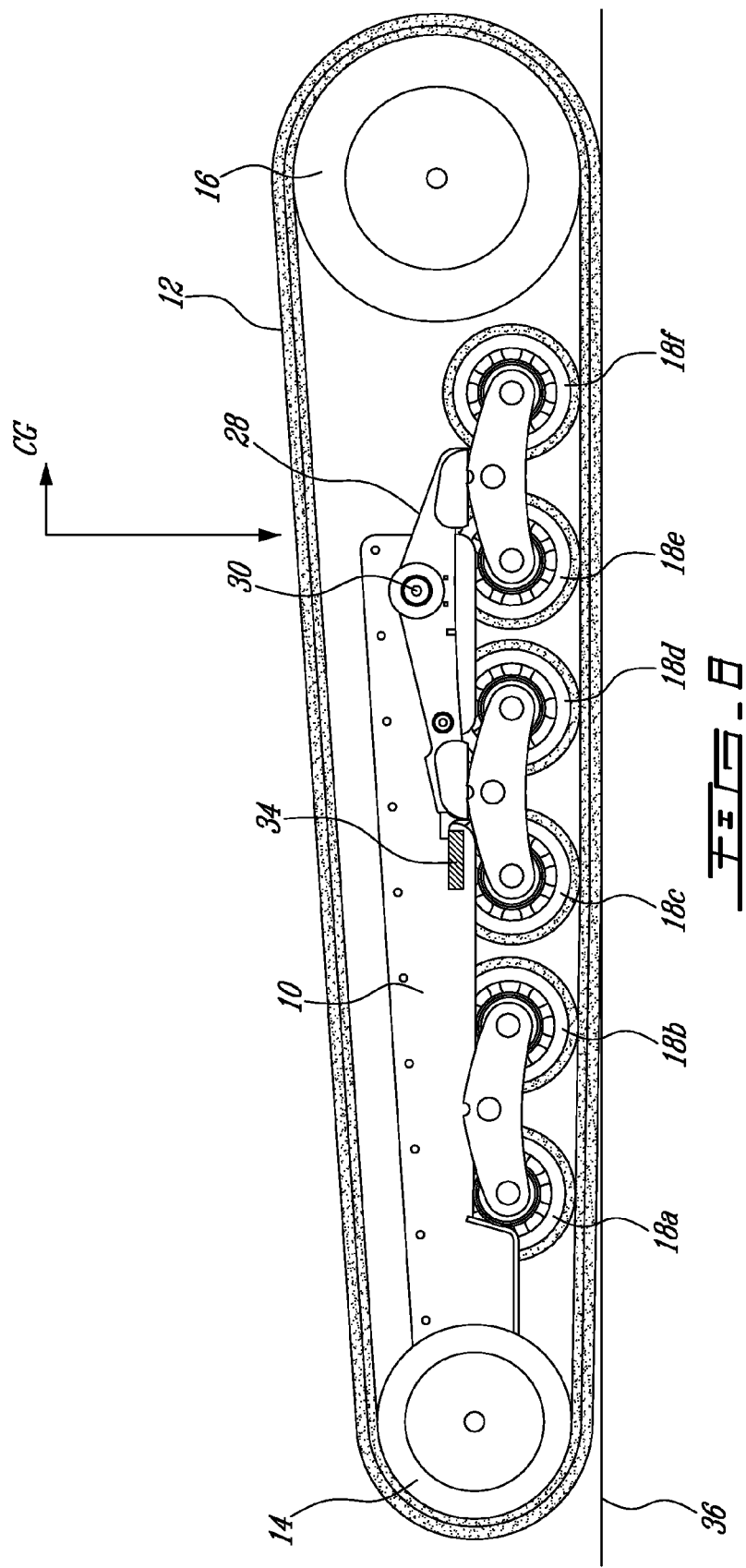

DUAL MODE UNDERCARRIAGE FOR TRACKED VEHICLE

CROSS-REFERENCE TO RELATED APPLICATION

This application is a continuation, and claims the benefit under 35 U.S.C. 120, of U.S. patent application Ser. No. 11/680,909 filed on Mar. 1, 2007 now U.S. Pat. No. 7,862,131.

FIELD OF THE INVENTION

The present invention relates to tracked vehicles. More specifically, the present invention is concerned with a dual mode undercarriage for tracked vehicles.

BACKGROUND OF THE INVENTION

A range of tracked vehicles, such as working vehicles, including asphalt pavers, crawlers, combine harvesters, earthmoving machines and transporters for example, experience shifts of their center of gravity or instabilities in balance, due to their carrying varying loads as they are used to spread material for example or to their supporting mobile heavy implements, or to high speed.

Indeed, it may happen that an additional weight due to material transported or unloaded or to an implement such as a screed on a paver for example, or a higher speed, destabilizes the vehicles, resulting in poor performance of the vehicles, premature failure of the traction system thereof, and damage to the underlying ground.

There is still a need for a dual mode undercarriage for tracked vehicles.

SUMMARY OF THE INVENTION

More specifically, in accordance with the present invention, there is provided a vehicle with a frame connecting a driver wheel, an idler wheel and mid-roller wheels, an endless track belt being tensioned around said driver wheel and said idler wheel and being in contact with said mid-roller wheels on a lower run thereof, the mid-roller wheels being arranged in bogies, including a front bogie, a middle bogie and a rear bogie, the front bogie having a first pivot axis, and the middle and rear bogies forming a tandem having a second pivot axis, wherein the first pivot axis and the second pivot axis act as load transfer pivots.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 4 is a detailed view of the rear part of the lateral belt arrangement of FIG. 2;

FIG. 5 illustrates a behavior of the front part of the lateral belt arrangement of FIG. 2;

FIGS. 6a to 6c show a deformable member provided in an alternative of the belt arrangement of FIG. 2;

FIG. 7 illustrates a behavior of the rear part of the lateral belt arrangement of FIG. 2;

FIG. 8 illustrates the lateral belt arrangement of FIG. 2 in a first mode; and

DESCRIPTION OF ILLUSTRATIVE EMBODIMENTS

The present invention is illustrated in further details by the following non-limiting examples.

Figure 1:
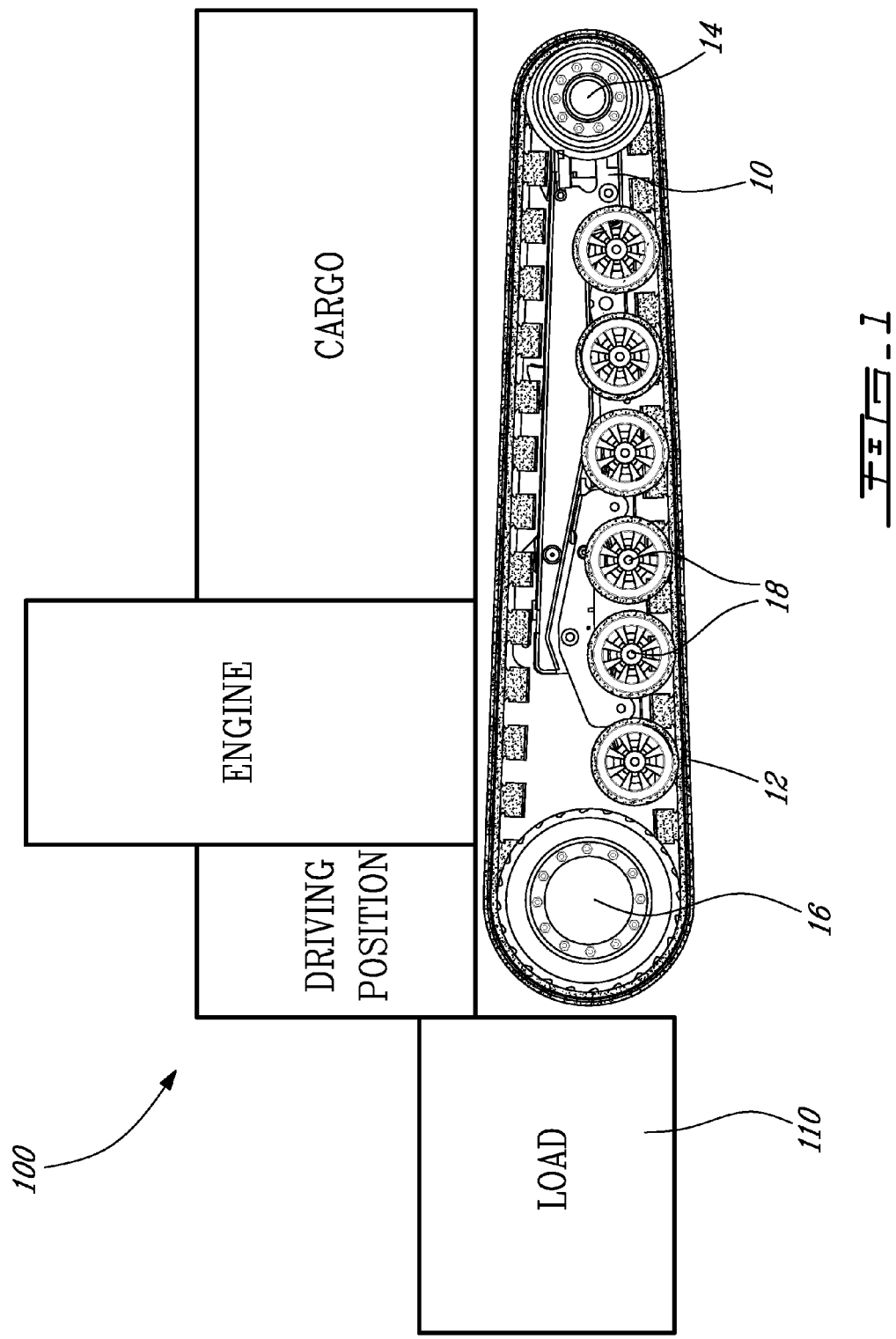
FIG. 1 is a schematic view of a tracked vehicle according to an embodiment of an aspect of the present invention.

As shown schematically in FIG. 1, a belt laying vehicle 100 comprises a track belt arrangement on each lateral side thereof, each track belt arrangement comprising an endless belt 12 entrained about an idler wheel 14 and a driver wheel 16 mounted in supporting relation to a frame 10, and mid-rollers 18. The frame 10 provides a flexible connection for the undercarriage including the wheels, the axles of the wheels, and the track belt 12. An implement 110, such as a screed for example, in the case of a paver, is located at one extremity of the vehicle, for example.

The vehicle is a tracked vehicle, such as a working vehicle, including for example asphalt pavers, crawlers, combine harvesters, earthmoving machines and transporters for example, which experiences shifts of its center of gravity or instabilities in balance, due to load distribution or speed for example.

Figure 2:
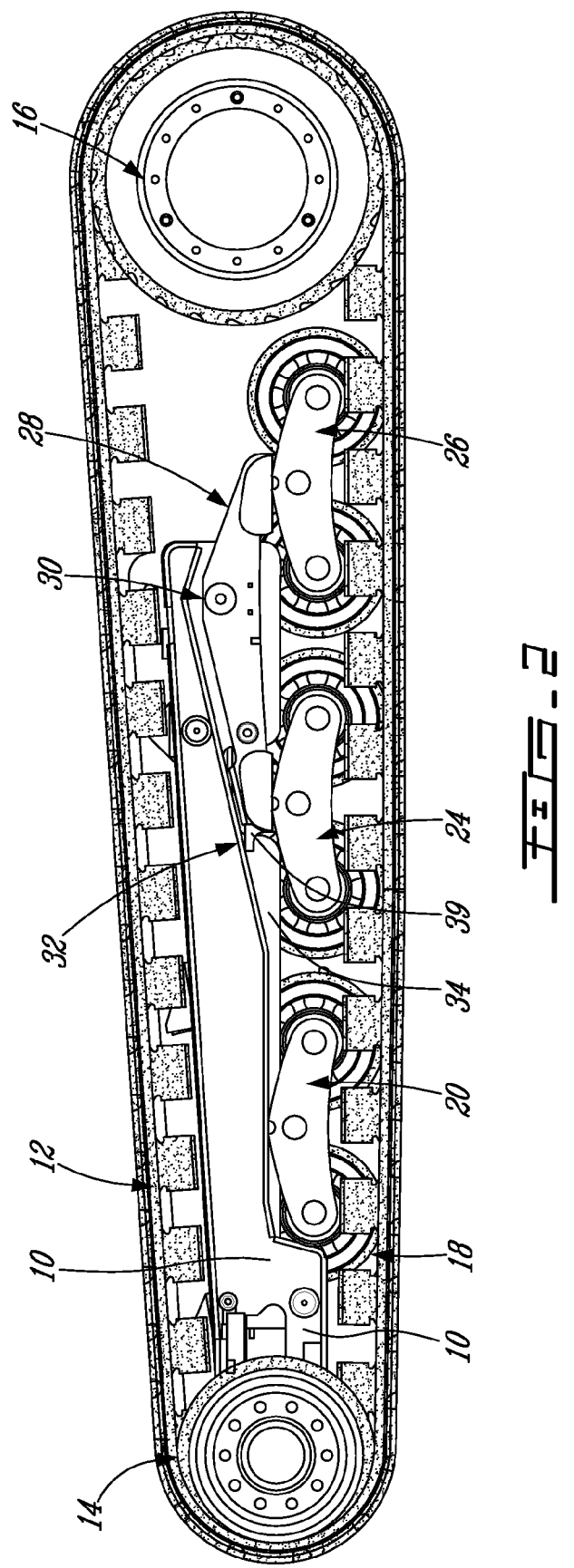
FIG. 2 is a view of a lateral belt arrangement of the vehicle of FIG. 1.

As shown in details in FIG. 2, the endless track belt 12 is tensioned around the driver wheel 16, the idler wheel 14 and is in contact with the mid-roller wheels 18 on a lower run thereof. A tensioning system (not shown) allows controlling the tension of the belt 12, as well known in the art.

The mid-roller wheels 18 are here arranged as bogies including a front bogie 20 of axis 22, and rear bogies 24 and 26 assembled in a tandem 28 of pivot axis 30.

Figure 3:
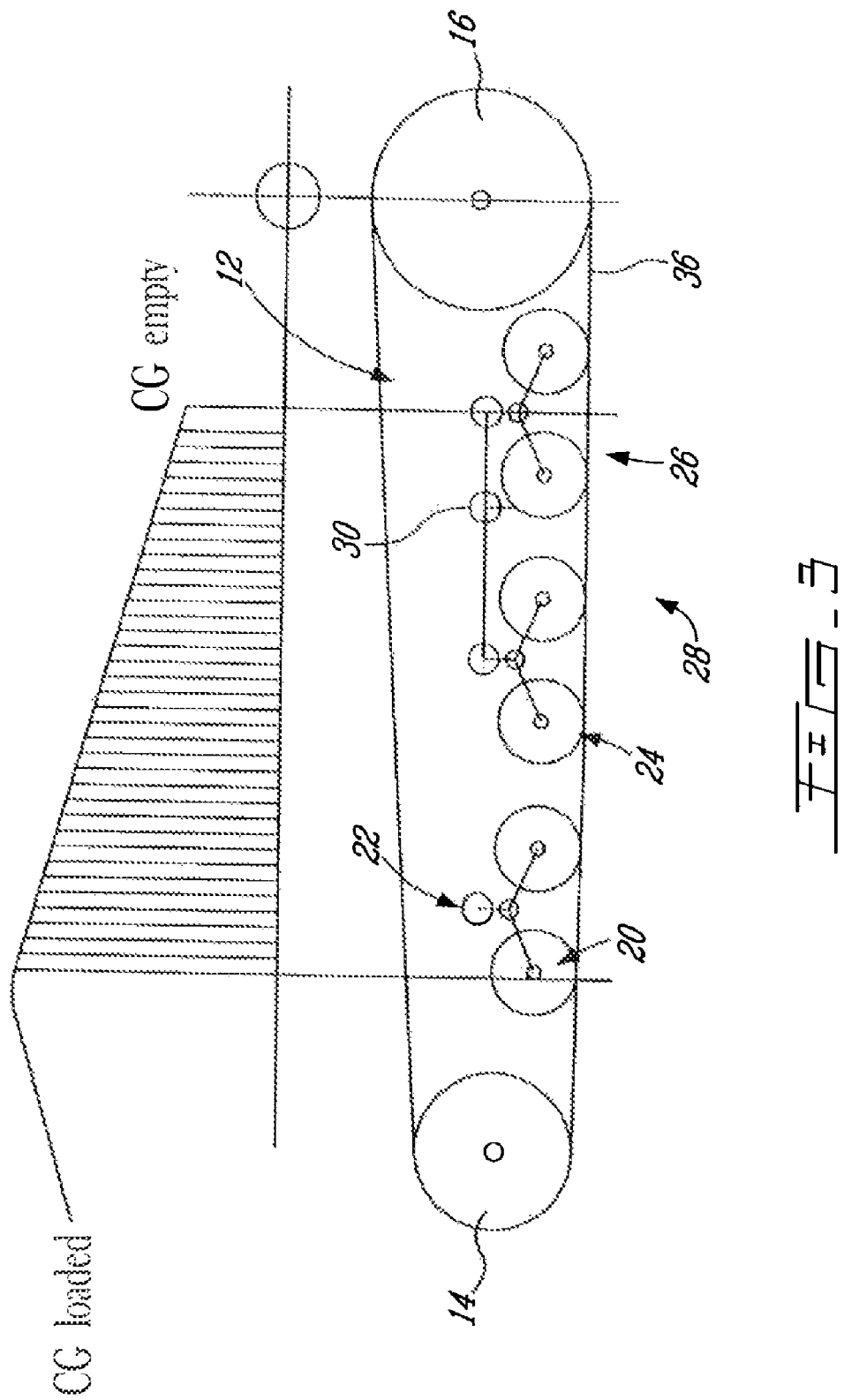
FIG. 3 illustrates the position of the axis of a rear tandem in the belt arrangement of FIG. 2, relative to the center of gravity of the vehicle.

The center of gravity of the vehicle may be determined without load (see label $CG_{empty}$ in FIG. 3), which corresponds to a maneuver mode, or travel mode, of the vehicle, and then with load thereon (see label $CG_{loaded}$ in FIG. 3), which corresponds to a working mode of the vehicle.

In the case of an asphalt paver for example, $CG_{empty}$ corresponds to the center of gravity of the paver when the hopper is empty and the screed is up; while $CG_{loaded}$ corresponds to the center of gravity of the paver when the hopper is loaded and the screed is on the float.

The frame 10 is tiltable around the pivot axis 30 of the rear tandem 28, located between these centers of gravity of the unloaded and loaded vehicle, whereby a varying length of the belt 12 is pressed down into contact with the underlying ground 36. The positioning of the pivot axis 30 is a function of characteristics of the vehicle, such as for example characteristics of the screed in the case of a paver as discussed hereinabove, and may take into account security factors.

The adjustment further comprises providing stoppers 32 and 34 about the frame 10, as best seen in FIG. 4.

An up stopper 32 consists, for example, of a calibrated plate, welded to the frame 10, to which a part of the tandem 28 comes in abutment, thereby stopping the pivot movement of the tandem 28 around the axis 30. The position of the plate 32 is determined so as to allow a target range of forward tilt of the tandem 28 before abutment with the plate 32. In fact, the position of the plate 32 determines an angle at which the load on the vehicle is transferred on the undercarriage, and the extent of this transfer.

A down stopper may consist of a member 34, also welded to the frame 10 for example, which comes into abutment with a finger 39 of the tandem 28, thereby limiting the rearward tilt. This stopper 34 limits the tilt rearwards and protects the drive wheel 16 from impacts with the underlying ground.

The stoppers 32 and 34 are pre-adjusted, when assembling the vehicle, according to the characteristics of the belt, such as the hardness of the rubber for example, or the diameter of the drive wheel 16, to control the rotation of the axis 30 so as to use only a desired front or rear part of the belt 12. The part of the belt 12, which is not required for a current operation, is made to slightly lift off the ground 36 under action of the stoppers.

As the center of gravity of the vehicle passes over the pivot axis 30 of the tandem 28 to the front, the vehicle tilts towards the front, until the plate 32 stops movement of the tandem 28 about the pivot axis 30. At this point, the tandem 28 is fixed, and the vehicle may only pivot about the bogie 24. As the load increases, the center of gravity of the vehicle keeps shifting forwards and eventually reaches the level of the axis 22 of the front bogie 20.

As shown in FIG. 5, the axis 22 of the front bogie 20 supports and stabilizes the load in the working mode of the vehicle. The axis 22, located between the bogie 24 and the idler wheel 14, generally acts to limit the load on the idler wheel 14, by limiting the unbalance towards the front of the vehicle.

The axis 22 acts as a load transfer pivot until the center of gravity of the vehicle crosses the pivot axis 22 from the rear, as will now be described.

As the load increases and the bogie 20 sinks down into the track 12, the idler wheel 14 comes into contact with the underground surface, thereby limiting the sinking of the bogie 20 in the track by an upwards reaction (see arrow (A) in FIG. 5). Once the idler wheel 14 is in contact with the underground surface, any additional load is distributed between all mid rollers, with the axis 22 of the bogie 20 acting as a load transfer pivot (FIG. 5-arrows (B) and (C)).

Figure 6A:
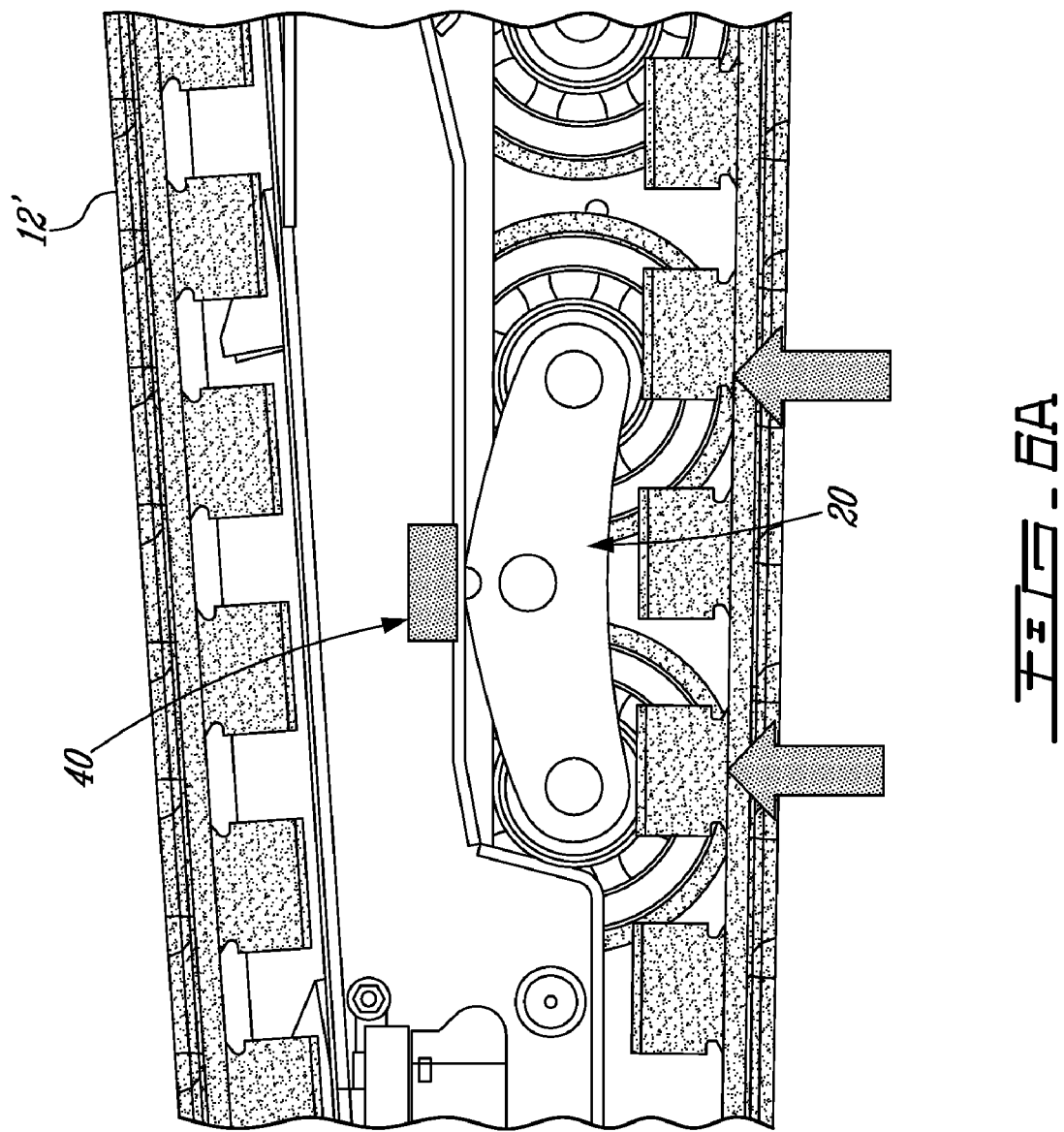

Alternatively, in the case of a rigid belt 12' such as a metal belt or a mixed metal and composite belt, as a substitute for the sinking of the bogie 20 into the resilient belt 12, it may be contemplated using a member, in rubber or in a deformable material, either added to the bogie 20 (see member 40 in FIGS. 6a and 6b), or included in the bogie 20 (see material 42 in FIG. 6c), which deforms under load. In this case, sinking of the member instead of the bogie 20 is obtained by deformation of this member.

As best seen in FIG. 7, in the working mode, the vehicle is tilted towards the front. As it does, the undercarriage structure, including the drive wheel 16, follows the movement, except for the tandem 28, which is stopped by the stopper 32. The drive wheel 16 is lifted up from the plane of the ground surface 36, thereby lying on a plane 33 different from the plane of the mid rollers 18c, 18d, 18e and 18f. The mid rollers 18c and 18d are in equilibrium under the load, and the mid roller 18e becomes a stabilizator as the pressure from the belt 12 back on the mid roller 18f acts as a tensioner, a cord being created between the drive wheel 16, which is lifted up, and the bogies 24 and 26, which remain on the ground.

Such actions and reactions interplay maintains the stability of the vehicle during accelerations, the rear tandem 28 allowing tensioning the track 12 during operations on the front part of the vehicle, i.e. on the rear end thereof as the drive wheel 16 is lifted from the ground 36, the rearest bogie 26 being in contact with the underground 36 with only one of the two mid-rollers thereof, the other one of the two mid-rollers thereof floating (see mid roller 18f in FIG. 9) and acting for tensioning the track 12 in case of oscillation of the vehicle due to movement of the vehicle. The occasional load on the wheel 18e on the ground 36, which tends to act on it upwards (see FIG. 7), acts on the floating wheel 18f downwards, which tensions the belt 12 since the drive wheel 16 is off the ground, as described hereinabove.

Thus, the position of the tandem 28 is defined and adjusted to yield optimized load transfer performances, by controlling the position of supporting points and pivoting points depending of the load distribution on the vehicle, the vehicle operating from the maneuverability mode to the working mode as the center of gravity of the vehicle is shifted.

In FIG. 8, the center of gravity CG of the vehicle being located at the rear of the axis 30, the front idler wheel 14 and the mid-rollers 18a, 18b are off the underlying ground 36, whereas the mid-rollers 18c, 18d, 18e and 18f are on the ground 36, maintained by stopper 34.

Figure 9:
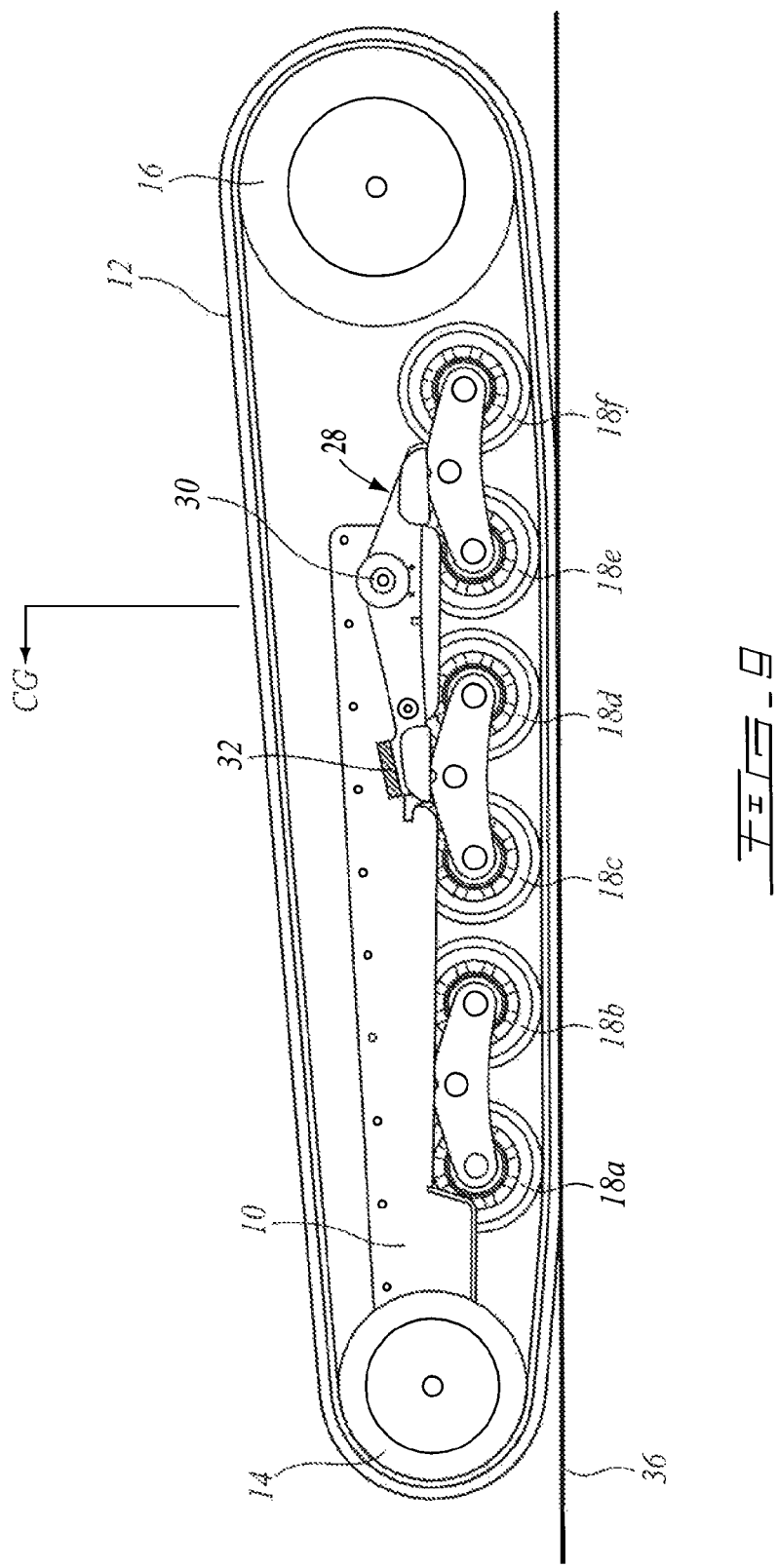
FIG. 9 illustrates the lateral belt arrangement of FIG. 2 in a second mode.

In FIG. 9, the center of gravity CG of the vehicle being located in front of the axis 30, the front idler wheel 14, as well as the rear drive wheel 16 and the rear mid-roller 18f are off the ground 36, while the mid-rollers 18a, 18 b, 18c, 18d and 18e are on the ground 36, maintained by stopper 32.

Hence, according to the displacement of the center of gravity of the vehicle, different modes are allowed, which correspond to different conformation of the wheels and belt, as will now be described.

In the maneuverability mode, a short working surface of the endless belt 12 is achieved, as shown in FIG. 8, with only mid-rollers 18c, 18d, 18e and 18f on the ground 36.

In the working mode, the working surface of the endless belt 12 is increased, as shown in FIG. 9, with mid-rollers 18a, 18 b, 18c, 18d and 18e on the ground 36.

As people in the art will appreciate, the present system may be applied to utility tracked vehicles submitted to load shifts or unbalances, for a dynamic load and balance control.

For example, asphalt pavers, when they have a loaded hopper and screed on the float, i.e. before and during paving, typically benefit from the working mode described hereinabove, and, when the hopper is empty and the screed up once the paving operation is over, typically benefit from the mobility mode described hereinabove.

The present system and method provide increased stability, which results in increased traction quality and speed, and allows reducing mechanical wear and stress by optimized weight distribution and adaptable steering characteristics. People in the art will appreciate that the present invention therefore allows increasing the productivity of the vehicles and of activities making use of them.

The present undercarriage allows a dynamic control of load distribution, thereby optimizing performance and reliability of the vehicle, and constancy in traction characteristics while maintaining agility, stability and directional control of the vehicle.

Although the present invention has been described hereinabove by way of specific embodiments thereof, it can be modified, without departing from the nature and teachings of the subject invention as defined in the appended claims.

The invention claimed is:

1. An undercarriage for a work vehicle, the work vehicle being equipped with a work implement, the undercarriage comprising:
   a) a frame;
   b) a plurality of wheels including:
      a drive wheel; and
      a plurality of roller wheels distributed along a longitudinal direction of the undercarriage; and
   c) an endless track disposed around the plurality of wheels for engaging the ground, the drive wheel being rotatable to drive the endless track, the plurality of roller wheels contacting a lower run of the endless track, the endless track having a traction-generating surface in contact with the ground to generate traction;
   wherein the undercarriage is operable:
   in a work mode when the work vehicle is in movement and the work implement is performing a work operation on the ground; and
   in a travel and maneuver mode when the work vehicle is in movement and the work implement has performed the work operation, the traction-generating surface of the endless track in the travel and maneuver mode being smaller than the traction-generating surface of the endless track in the work mode.

2. The undercarriage claimed in claim 1, wherein a center of gravity of the work vehicle can shift along the longitudinal direction of the undercarriage between a first position and a second position, the undercarriage being configured to acquire the work mode when the center of gravity of the work vehicle is at the first position and to acquire the travel and maneuver mode when the center of gravity of the work vehicle is at the second position.

3. The undercarriage claimed in claim 1, wherein the work implement is movable between a first implement position and a second implement position, the undercarriage being configured to acquire the work mode when the work implement is in the first implement position and to acquire the travel and maneuver mode when the work implement is in the second implement position.

4. The undercarriage claimed in claim 3, wherein the first implement position is lower than the second implement position.

5. The undercarriage claimed in claim 1, wherein the plurality of roller wheels provides a number of load-bearing roller wheels pressing the endless track onto the ground and bearing part of a weight of the work vehicle, the number of load-bearing roller wheels in the travel and maneuver mode being different from the number of load-bearing roller wheels in the work mode.

6. The undercarriage claimed in claim 5, wherein the number of load-bearing roller wheels in the travel and maneuver mode is less than the number of load-bearing roller wheels in the work mode.

7. The undercarriage claimed in claim 6, wherein the number of load-bearing roller wheels in the travel and maneuver mode is at least two.

8. The undercarriage claimed in claim 6, wherein the number of load-bearing roller wheels in the work mode is less than all the roller wheels.

9. The undercarriage claimed in claim 1, wherein a given one of the roller wheels presses the endless track onto the ground in the work mode and does not press the endless track onto the ground in the travel and maneuver mode.

10. The undercarriage claimed in claim 9, wherein the given one of the roller wheels is a first given one of the roller wheels, and a second given one of the roller wheels presses the endless track onto the ground in the travel and maneuver mode and does not press the endless track onto the ground in the work mode.

11. The undercarriage claimed in claim 1, comprising a wheel-carrying structure which carries at least one of the roller wheels and is pivotable relative to the frame about a pivot axis, the undercarriage being configured to acquire the work mode or the travel and maneuver mode by controlling a pivot movement of the wheel-carrying structure relative to the frame about the pivot axis.

12. The undercarriage claimed in claim 11, wherein a center of gravity of the work vehicle can shift along the longitudinal direction of the undercarriage between a first position and a second position, the undercarriage being configured to acquire the work mode when the center of gravity of the work vehicle is at the first position and to acquire the travel and maneuver mode when the center of gravity of the work vehicle is at the second position, the pivot axis being located between the first position and the second position of the center of gravity of the work vehicle.

13. The undercarriage claimed in claim 11, comprising a stopper stopping the pivot movement of the wheel-carrying structure relative to the frame about the pivot axis when the undercarriage operates in a particular one of the work mode and the travel and maneuver mode.

14. The undercarriage claimed in claim 13, wherein, when the stopper stops the pivot movement of the wheel-carrying structure relative to the frame about the pivot axis, a given roller wheel of the at least one of the roller wheels carried by the wheel-carrying structure is lifted to not press the endless track onto the ground.

15. The undercarriage claimed in claim 13, wherein the stopper is a first stopper and the particular one of the work mode and the travel and maneuver mode is the work mode, the undercarriage comprising a second stopper stopping the pivot movement of the wheel-carrying structure relative to the frame about the pivot axis when the undercarriage operates in the travel and maneuver mode.

16. The undercarriage claimed in claim 11, wherein the wheel-carrying structure comprises:
   a structural support pivotally mounted to the frame at the pivot axis;
   a first bogie pivotally mounted to the structural support and carrying first and second ones of the roller wheels; and
   a second bogie pivotally mounted to the structural support and carrying third and fourth ones of the roller wheels.

17. The undercarriage claimed in claim 16, wherein the pivot axis is a first pivot axis, the undercarriage comprising a third bogie carrying fifth and sixth ones of the roller wheels, the third bogie being pivotable relative to the frame about a second pivot axis spaced apart from the first pivot axis along the longitudinal direction of the undercarriage.

18. The undercarriage claimed in claim 1, wherein the plurality of wheels comprises an idler wheel, the drive wheel being located at a first longitudinal end of the undercarriage and the idler wheel being located at a second longitudinal end of the undercarriage.

19. The undercarriage claimed in claim 1, wherein the endless track has a rubber body.

20. A work vehicle comprising the undercarriage claimed in claim 1.

21. The work vehicle claimed in claim 20, wherein the work vehicle is one of an asphalt paver, a harvester, and an earthmoving machine.

22. An undercarriage for a work vehicle, the undercarriage comprising:
a) a frame;
b) a plurality of wheels including:
a drive wheel; and
a plurality of roller wheels distributed along a longitudinal direction of the undercarriage; and
c) an endless track disposed around the plurality of wheels for engaging the ground, the drive wheel being rotatable to drive the endless track, the plurality of roller wheels contacting a lower run of the endless track, the endless track having a traction-generating surface in contact with the ground to generate traction;
wherein, when the work vehicle is in movement on the ground, the undercarriage is operable in a work mode and in a travel and maneuver mode, the traction-generating surface of the endless track in the travel and maneuver mode being smaller than the traction-generating surface of the endless track in the work mode.

23. The undercarriage claimed in claim 22, wherein the plurality of roller wheels provides a number of load-bearing roller wheels pressing the endless track onto the ground and bearing part of a weight of the work vehicle, the number of load-bearing roller wheels in the travel and maneuver mode being different from the number of load-bearing roller wheels in the work mode.

24. The undercarriage claimed in claim 23, wherein the number of load-bearing roller wheels in the travel and maneuver mode is less than the number of load-bearing roller wheels in the work mode.

25. The undercarriage claimed in claim 24, wherein the number of load-bearing roller wheels in the travel and maneuver mode is at least two.

26. The undercarriage claimed in claim 24, wherein the number of load-bearing roller wheels in the work mode is less than all the roller wheels.

27. The undercarriage claimed in claim 22, wherein a given one of the roller wheels presses the endless track onto the ground in the work mode and does not press the endless track onto the ground in the travel and maneuver mode.

28. The undercarriage claimed in claim 27, wherein the given one of the roller wheels is a first given one of the roller wheels, and a second given one of the roller wheels presses the endless track onto the ground in the travel and maneuver mode and does not press the endless track onto the ground in the work mode.

29. The undercarriage claimed in claim 22, wherein a center of gravity of the work vehicle can shift along the longitudinal direction of the undercarriage between a first position and a second position, the undercarriage being configured to acquire the work mode when the center of gravity of the work vehicle is at the first position and to acquire the travel and maneuver mode when the center of gravity of the work vehicle is at the second position.

30. The undercarriage claimed in claim 22, wherein the work vehicle is equipped with a work implement, the undercarriage being configured to acquire the work mode when the work implement is performing a work operation on the ground and to acquire the travel and maneuver mode when the work implement is not performing the work operation.

31. The undercarriage claimed in claim 22, wherein the work vehicle is equipped with a work implement, the work implement being movable between a first implement position and a second implement position, the undercarriage being configured to acquire the work mode when the work implement is in the first implement position and to acquire the travel and maneuver mode when the work implement is in the second implement position.

32. The undercarriage claimed in claim 31, wherein the first implement position is lower than the second implement position.

33. The undercarriage claimed in claim 22, comprising a wheel-carrying structure which carries at least one of the roller wheels and is pivotable relative to the frame about a pivot axis, the undercarriage being configured to acquire the work mode or the travel and maneuver mode by controlling a pivot movement of the wheel-carrying structure relative to the frame about the pivot axis.

34. The undercarriage claimed in claim 33, wherein a center of gravity of the work vehicle can shift along the longitudinal direction of the undercarriage between a first position and a second position, the undercarriage being configured to acquire the work mode when the center of gravity of the work vehicle is at the first position and to acquire the travel and maneuver mode when the center of gravity of the work vehicle is at the second position, the pivot axis being located between the first position and the second position of the center of gravity of the work vehicle.

35. The undercarriage claimed in claim 34, comprising a stopper stopping the pivot movement of the wheel-carrying structure relative to the frame about the pivot axis when the undercarriage operates in a particular one of the work mode and the travel and maneuver mode.

36. The undercarriage claimed in claim 35, wherein, when the stopper stops the pivot movement of the wheel-carrying structure relative to the frame about the pivot axis, a given roller wheel of the at least one of the roller wheels carried by the wheel-carrying structure is lifted to not press the endless track onto the ground.

37. The undercarriage claimed in claim 35, wherein the stopper is a first stopper and the particular one of the work mode and the travel and maneuver mode is the work mode, the undercarriage comprising a second stopper stopping the pivot movement of the wheel-carrying structure relative to the frame about the pivot axis when the undercarriage operates in the travel and maneuver mode.

38. The undercarriage claimed in claim 33, wherein the wheel-carrying structure comprises:
a structural support pivotally mounted to the frame at the pivot axis;
a first bogie pivotally mounted to the structural support and carrying first and second ones of the roller wheels; and
a second bogie pivotally mounted to the structural support and carrying third and fourth ones of the roller wheels.

39. The undercarriage claimed in claim 38, wherein the pivot axis is a first pivot axis, the undercarriage comprising a third bogie carrying fifth and sixth ones of the roller wheels, the third bogie being pivotable relative to the frame about a second pivot axis spaced apart from the first pivot axis along the longitudinal direction of the undercarriage.

40. The undercarriage claimed in claim 22, wherein the plurality of wheels comprises an idler wheel, the drive wheel being located at a first longitudinal end of the undercarriage and the idler wheel being located at a second longitudinal end of the undercarriage.

41. The undercarriage claimed in claim 22, wherein the endless track has a rubber body.

42. A work vehicle comprising the undercarriage claimed in claim 22.

43. The work vehicle claimed in claim 42, wherein the work vehicle is one of an asphalt paver, a harvester, and an earthmoving machine.

44. A method of using a work vehicle, the work vehicle including an undercarriage comprising:
   a) a frame;
   b) a plurality of wheels including:
      a drive wheel; and
      a plurality of roller wheels distributed along a longitudinal direction of the undercarriage; and
   c) an endless track disposed around the plurality of wheels for engaging the ground, the drive wheel being rotatable to drive the endless track, the plurality of roller wheels contacting a lower run of the endless track, the endless track having a traction-generating surface in contact with the ground to generate traction;

the method comprising:
   i) moving the work vehicle on the ground with the undercarriage operating in a work mode; and
   ii) moving the work vehicle on the ground with the undercarriage operating in a travel and maneuver mode, the traction-generating surface of the endless track in the travel and maneuver mode being smaller than the traction-generating surface of the endless track in the work mode.

* * * * *